US010815002B2

(12) United States Patent
Ding

(10) Patent No.: US 10,815,002 B2
(45) Date of Patent: Oct. 27, 2020

(54) STRUCTURAL COMPONENT OF AIRCRAFT WING BODY AND AIRCRAFT INCLUDING THE STRUCTURAL COMPONENT

(71) Applicant: AIRBUS (S.A.S.), Blagnac (FR)

(72) Inventor: Mei Ding, Beijing (CN)

(73) Assignee: AIRBUS (S.A.S.), Blagnac (FR)

( * ) Notice: Subject to any disclaimer, the term of this patent is extended or adjusted under 35 U.S.C. 154(b) by 431 days.

(21) Appl. No.: 15/601,473

(22) Filed: May 22, 2017

(65) Prior Publication Data

US 2017/0341774 A1    Nov. 30, 2017

(30) Foreign Application Priority Data

May 25, 2016   (CN) .......................... 2016 1 0354034

(51) Int. Cl.
  *B64D 45/02*         (2006.01)
  *B64C 3/28*          (2006.01)
  (Continued)

(52) U.S. Cl.
  CPC ................ *B64D 45/02* (2013.01); *B64C 3/20* (2013.01); *B64C 3/26* (2013.01); *B64C 3/28* (2013.01);
  (Continued)

(58) Field of Classification Search
  CPC .. B64D 45/02; B64C 1/00; B64C 1/06; B64C 1/12; B64C 3/18; B64C 3/20; B64C 3/26;
  (Continued)

(56) References Cited

U.S. PATENT DOCUMENTS

| 4,667,906 A | 5/1987 | Suárez et al. | |
| 4,866,839 A * | 9/1989 | Covey | B29C 66/74 29/825 |

(Continued)

FOREIGN PATENT DOCUMENTS

| CN | 101786499 | 7/2010 |
| CN | 101821161 | 9/2010 |

(Continued)

OTHER PUBLICATIONS

Chinese and English Translation of First Office Action for Chinese Patent Application No, 201610354034.X, 24 pages, dated Sep. 9, 2019.

*Primary Examiner* — Richard R. Green
*Assistant Examiner* — Steven J Shur
(74) *Attorney, Agent, or Firm* — Nixon & Vanderhye P.C.

(57) ABSTRACT

The present disclosure relates to a structural component of an aircraft wing body and an aircraft including the structural component. According to an aspect of the present disclosure, a structural component of an aircraft wing body is provided. The structural component includes a body part and a profile. The body part includes an edge portion formed by end portions of a first skin and a second skin of the body part superposed together. The profile is attached to the edge portion. The profile has an outer profile conforming to an outer profile of the body part such that the structural component, as a whole, exhibits an aerodynamic outer profile after the profile is attached to the edge portion. The profile is attached to the edge portion via a plurality of separate intermediate members or by contacting the edge portion.

9 Claims, 6 Drawing Sheets

(51) Int. Cl.
  *B64C 3/26* (2006.01)
  *B64C 3/20* (2006.01)
  *B64C 5/02* (2006.01)
  *B64C 5/06* (2006.01)
  *B64C 5/00* (2006.01)
  *B64C 9/00* (2006.01)

(52) U.S. Cl.
  CPC .................. *B64C 5/00* (2013.01); *B64C 5/02* (2013.01); *B64C 5/06* (2013.01); *B64C 9/00* (2013.01)

(58) Field of Classification Search
  CPC ....... B64C 3/28; B64C 2003/147; B64C 5/00; B64C 5/02; B64C 9/00; B64C 5/06
  USPC ...................................................... 244/123.1
  See application file for complete search history.

(56) References Cited

U.S. PATENT DOCUMENTS

| | | | |
|---|---|---|---|
| 6,779,757 | B2 | 8/2004 | Thomas, Jr. |
| 7,871,041 | B2 | 1/2011 | Brice et al. |
| 8,123,167 | B2 | 2/2012 | Olmi et al. |
| 8,337,658 | B2 * | 12/2012 | Hasegawa ........... B29C 66/7392 156/272.2 |
| 8,444,091 | B2 | 5/2013 | Balsa González et al. |
| 9,108,721 | B2 | 8/2015 | De Gregorio Hurtado et al. |
| 9,481,157 | B2 * | 11/2016 | Ackerman ................ B64F 5/40 |
| 10,294,573 | B2 * | 5/2019 | Parkos, Jr. ................. C25D 1/02 |
| 2010/0148006 | A1 | 6/2010 | Olmi et al. |
| 2010/0155528 | A1 | 6/2010 | Balsa Gonzalez et al. |
| 2010/0193638 | A1 | 8/2010 | Martinez Valdegrama et al. |
| 2010/0264273 | A1 | 10/2010 | Gallant et al. |
| 2011/0271509 | A1 | 11/2011 | Willdig et al. |
| 2014/0103160 | A1 | 4/2014 | JareñDiz Lois |
| 2014/0339370 | A1 * | 11/2014 | De Gregorio Hurtado ................ B64C 3/28 244/35 R |
| 2015/0251401 | A1 | 9/2015 | Ackerman et al. |
| 2016/0264257 | A1 | 9/2016 | Han et al. |

FOREIGN PATENT DOCUMENTS

| | | |
|---|---|---|
| CN | 10230771 | 12/2011 |
| CN | 102282067 | 12/2011 |
| CN | 104890890 | 9/2015 |
| CN | 204750581 | 11/2015 |
| EP | 2716544 | 4/2014 |

* cited by examiner

STRUCTURAL COMPONENT OF AIRCRAFT WING BODY AND AIRCRAFT INCLUDING THE STRUCTURAL COMPONENT

This application claims priority to Chinese Patent Application No. 201610354034.X, titled "STRUCTURAL COMPONENT OF AIRCRAFT WING BODY AND AIRCRAFT INCLUDING THE STRUCTURAL COMPONENT", filed with the Chinese State Intellectual Property Office on May 25, 2016, which is incorporated by reference in its entirety herein.

FIELD OF THE DISCLOSURE

This disclosure relates to the field of aircraft, and more particularly to a structural component making improvements in aspects of formation and maintenance of aerodynamic outer profile, and an aircraft including the structural component.

BACKGROUND OF THE DISCLOSURE

In aircrafts such as airplanes, a large number of electrostatic charges are apt to be accumulated at a tip and a trailing edge of, for example, a wing, a horizontal empennage and a vertical empennage (which may also be collectively referred to as wing bodies), especially in cases that skins of the wing, the horizontal empennage and the vertical empennage are made of a composite material (such as a carbon fiber composite material) for improving a ratio of strength to weight and a ratio of rigidity to weight of the skins. In order to allow the current (static electricity) to be released to the atmosphere so as to protect related structures of the aircraft, or in some cases, in order to introduce electric signals (current, voltage etc.) outside of the aircraft into the inside of the aircraft, at, for example, a trailing edge portion of a structural component (for example, an elevator) of an empennage or a wing, an accessory (for example, a metal profile) easily to be detached and maintained with a high electrical conductivity is provided to be attached to a body part of the structural component so as to maintain continuity of electrical conductivity of the structural component.

Reference is made to FIGS. 1A and 1B (FIGS. 1A and 1B are respectively schematic views illustrating the structure of an elevator according to related art), in an elevator (structural component) 42a' according to related art, a profile 140' located at a trailing edge portion 122' of a body part 120' of the elevator 42a' is provided. As illustrated in FIG. 1A, the profile 140' includes multiple sections which are arranged along a longitudinal direction LD of the profile, and a conductive lapping sheet 150' is provided on an outer side between two adjacent sections and protrudes outward and laps the two adjacent sections to maintain continuity of electrical conductivity. As illustrated in FIG. 1B, an outer profile of the profile 140' is not adapted or conforming to an outer profile of the body part 120' aerodynamically, thus after the profile 140' is attached to the body part 120' via a semi-round head rivet, the elevator 42a', as a whole, does not have an outer profile conforming to aerodynamics, i.e., has an noticeable stepped portion at an outer side. Therefore, in order to allow the elevator 42a' as a whole to have an outer profile conforming to aerodynamics, it is required to apply aerodynamic fillers 155' such as a resin sealant to the outside attachment area of the profile 140' with the body part 120'.

In another structural component disclosed in US2010/0155528A1, a first skin and a second skin of the body part are not connected (superposed) together at the rear end thereof, and the U-shaped profile is formed at the free ends thereof with a recess, thereby the free ends of the U-shaped profile are disposed between the first skin and the second skin after the U-shaped profile is attached to the rear end of the body part.

In yet another structural component disclosed in U.S. Pat. No. 9,108,721B2, a lightweight part is provided which is formed integrally. The lightweight part is of substantially V-shaped and formed with a central hole into which an edge portion of the body part is inserted. In addition, the metal profile is mounted on the lightweight part via an adhesive layer, and the metal profile is avoided from contacting the skin of the body part. In addition, the peak of the V-shaped lightweight part is rounded so as to match the rounded vertex of the metal profile.

Herein, it is to be noted that the technical contents in this section are provided to help those skilled in the art to understand the present disclosure, and they do not necessarily constitute the prior art.

SUMMARY OF THE DISCLOSURE

Provided in this section is a general summary of the present disclosure, and is not the full scope of the present disclosure or the full disclosure of all features of the present disclosure.

An object of the present disclosure is to provide a structural component in which the treatment of applying aerodynamic fillers to the outside of the structural component can be avoided to form an outer profile conforming to aerodynamics.

Another object of the present disclosure is to provide a structural component which allows for a simplified manufacturing process and/or an improvement in the accuracy of forming an aerodynamic outer profile.

Another object of the present disclosure is to provide a structural component which can prevent the material of an outer profile from falling to pieces and being disengaged and thus can maintain the outer profile to conform to aerodynamic properties.

Another object of the present disclosure is to provide a structural component which can maintain continuity of electrical conductivity and avoid metal contact corrosion and the like while maintaining the weight of the structural component to be substantially constant or reducing the weight.

Another object of the present disclosure is to provide a structural component which may efficiently obtain an outer profile conforming to aerodynamics without changing the skin and the front-to-rear width and the rear end thickness of the profile.

A further object of the present disclosure is to provide an aircraft including the structural component described above.

In order to achieve one or more of the above objects, according to an aspect of the present disclosure, a structural component of an aircraft wing body is provided, the structural component including a body part and a profile, the body part including an edge portion formed by end portions of a first skin and a second skin of the body part superposed together, the profile being attached to the edge portion, wherein the profile has an outer profile conforming to an outer profile of the body part such that the structural component, as a whole, exhibits an aerodynamic outer profile after the profile is attached to the edge portion, and wherein the profile is attached to the edge portion via a plurality of separate intermediate members, or the profile is attached to the edge portion by contacting the edge portion.

In the above structural component, the profile is a substantially U-shaped profile having a first branch portion and a second branch portion, and the profile is attached to the edge portion in such a manner that the edge portion is disposed between the first branch portion and the second branch portion.

In the above structural component, the body part is provided with body-part-conductive-region extending to the edge portion.

In the above structural component, in a case where the profile is attached to the edge portion via the intermediate member: the profile is made of a first conductive material, the body-part-conductive-region is made of a second conductive material, and a first intermediate member, configured to be in contact with the body-part-conductive-region, of the intermediate member is made of a third conductive material which does not induce corrosion with the second conductive material.

In the above structural component, the profile includes a plurality of sections arranged along a longitudinal direction of the profile, and the intermediate member further includes a conductive second intermediate member lapping two adjacent sections of the plurality of sections from the inside thereof and a third intermediate member provided in at least a part of the remaining space between the profile and the edge portion.

In the above structural component, the first conductive material is aluminium alloy or aluminium, the second conductive material is a copper mesh, the third conductive material is steel, the second intermediate member is made of aluminium alloy or aluminium, and the third intermediate member is made of glass fiber reinforced plastic.

In the above structural component, the edge portion includes a first side surface facing the first branch portion and a second side surface facing the second branch portion, and only the first side surface is provided with the body-part-conductive-region, and the first intermediate member, the second intermediate member and the third intermediate member are provided in a space between the first branch portion and the first side surface, and only the third intermediate member is provided in a space between the second branch portion and the second side surface.

In the above structural component, in a case where the profile is attached to the edge portion via the intermediate member: the profile is made of a composite material and is provided with a profile-conductive-region, and the intermediate member includes a conductive fourth intermediate member which is in contact with the body-part-conductive-region and is electrically connected with the profile-conductive-region.

In the above structural component, the edge portion includes a first side surface facing the first branch portion and a second side surface facing the second branch portion, and only the first side surface is provided with the body-part-conductive-region, the fourth intermediate member contacts the first side surface, and a fifth intermediate member is provided in a space between the fourth intermediate member and the first branch portion, and a sixth intermediate member is provided in a space between the second side surface and the second branch portion.

In the above structural component, the body-part-conductive-region includes a copper mesh, the profile-conductive-region includes a copper mesh, the fourth intermediate member is made of a copper plate (pure copper or copper alloy plate), the fifth intermediate member is a sealant, and the sixth intermediate member is made of glass fiber reinforced plastic.

In the above structural component, the profile-conductive-region is provided on an outer surface of the profile, and the profile-conductive-region is electrically connected with the fourth intermediate member via a washer (preferably dimpled washer) in contact with the profile-conductive-region and a conductive fastener in contact with the washer.

In the above structural component, the profile is provided with at least one cutout portion allowing a portion of the fourth intermediate member to be exposed. Preferably, the at least one cutout portion allows an aircraft static discharger to be mounted to the exposed portion of the fourth intermediate member.

In the above structural component, the fourth intermediate member extends over the entire region of the profile in a longitudinal direction thereof.

In the above structural component, in a case where the profile is attached to the edge portion by contacting the edge portion: the profile includes a plurality of sections arranged along a longitudinal direction of the profile, and a first section, not in contact with the body-part-conductive-region, of the plurality of sections is made of a first conductive material, the body-pan-conductive-region is made of a second conductive material, at least a portion of a second section of the plurality of sections, which is in contact with the body-part-conductive-region, is made of a third conductive material which does not induce corrosion with the second conductive material.

In the above structural component, each of the plurality of sections includes a first side portion and a second side portion connected (preferably welded) together, only one side surface of two side surfaces of the edge portion is provided with the body-part-conductive-region, and only a first side part of the second section, which is in contact with the body-part-conductive-region, is made of the third conductive material.

In the above structural component, the first conductive material is aluminium alloy or aluminium, the second conductive material is a copper mesh, and the third conductive material is steel.

In the above structural component, a lapping portion is formed between two adjacent sections of the plurality of sections.

In the above structural component, a vertex space defined by a vertex section of the profile is vacant without any members being disposed therein.

In the above structural component, a countersunk fastener adapted to fasten the profile to the body part is provided.

In the above structural component, a sealant is provided to fill a gapping at the profile, a gapping at the body part and/or a gapping between the profile and the body part.

In the above structural component, the edge portion is a trailing edge with reference to an aircraft flight direction.

In the above structural component, the aircraft wing body includes an empennage and a wing, and the structural component is an elevator of a horizontal empennage of the empennage, a horizontal fin plane of a horizontal empennage of the empennage, a rudder of a vertical empennage of the empennage, a vertical fin plane of a vertical empennage of the empennage, a winglet of the wing and/or an aileron of the wing.

In addition, optionally, in the above structural component, the profile includes a plurality of sections arranged along a longitudinal direction of the profile, and each of the plurality of sections is made of the same or different materials.

In addition, optionally, in the above structural component, the profile is a U-shaped profile whose inner surface and outer surface extending continuously and smoothly.

In addition, optionally, in the above structural component, the first skin and the second skin are sandwich type composite materials.

In addition, optionally, in the above structural component: the profile is made of a conductive material, or the profile is made of a composite material and is provided with a profile-conductive-region.

In order to achieve one or more of the above objects, according to another aspect of the present disclosure, an aircraft is provided. The aircraft includes the structural component as described above.

According to the present disclosure, since the profile is modified to have an outer profile adapted to an outer profile of the body part and conforming to aerodynamics, the treatment, such as applying aerodynamic fillers, performed externally on the structural member after the profile is attached to the body part can be avoided. Thus, the manufacturing process is simplified, the accuracy of forming the aerodynamic outer profile is improved, and the case can be avoided that the aerodynamic filler falls to pieces and is disengaged after long time exposure to the air and thereby the outer profile can be maintained to conform to aerodynamic properties. Further, since the profile is constituted by multiple spliced sections, and different intermediate members are used depending on specific conditions such as requirements of electrical conductivity, space and weight, it is possible to maintain continuity of electrical conductivity and avoid metal contact corrosion and so on while maintaining the weight of the structural component to be substantially constant. Further, as compared to the solution where the U-shaped profile is formed at the free ends thereof with a recess, the profile is easy to be manufactured and the strength thereof can be maintained since the profile has an inner surface and an outer surface extending continuously and smoothly. Further, as compared to the solution where a lightweight part is provided which is formed integrally and has a plurality of holes, the intermediate members are easy to be manufactured and arranged and the adaptability of the structural component is improved since a plurality of separate intermediate members are used. Also, according to the present disclosure, the structural component which has the outer profile conforming to aerodynamics can be obtained efficiently without changing the skins and the front-to-rear width and the rear end thickness of the profile.

BRIEF DESCRIPTION OF THE DRAWINGS

The features and advantages of one or more embodiments of the present disclosure will become easier to be understood by way of the following description in conjunction with accompany drawings, in which.

DETAILED DESCRIPTION

Hereinafter, the present disclosure will be described in detail with reference to the drawings and in conjunction with the exemplify embodiments. The following detailed description to the present disclosure is for illustration purpose only and is in no way to limit the present disclosure and its application or usage.

Figure 2:
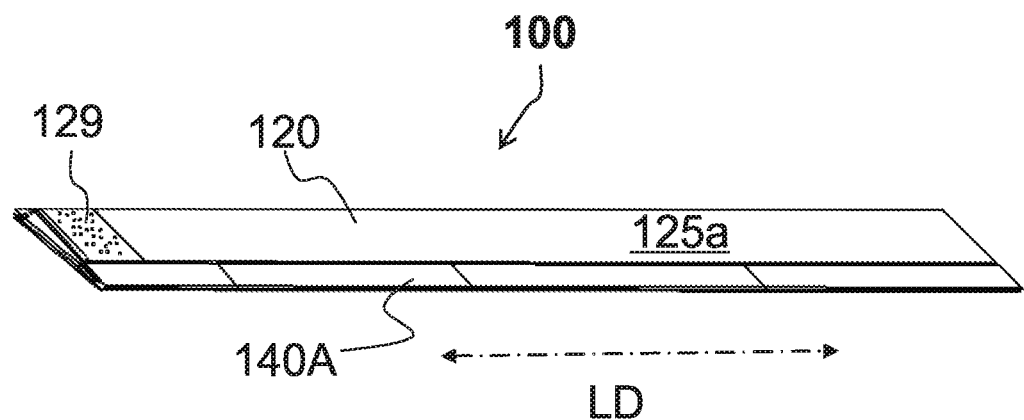
FIG. 2 is a schematic view illustrating a structural component according to the present disclosure.
Figure 3:
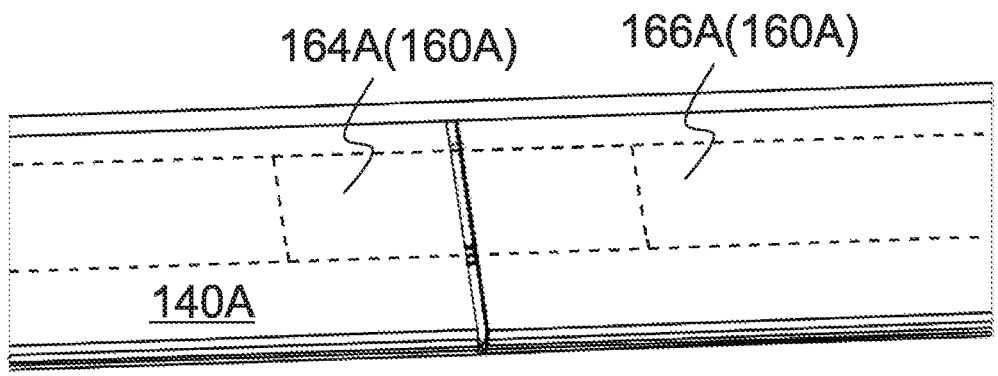
FIG. 3 is a schematic view illustrating a part of a structural component according to a first embodiment of the present disclosure.
Figure 4A:
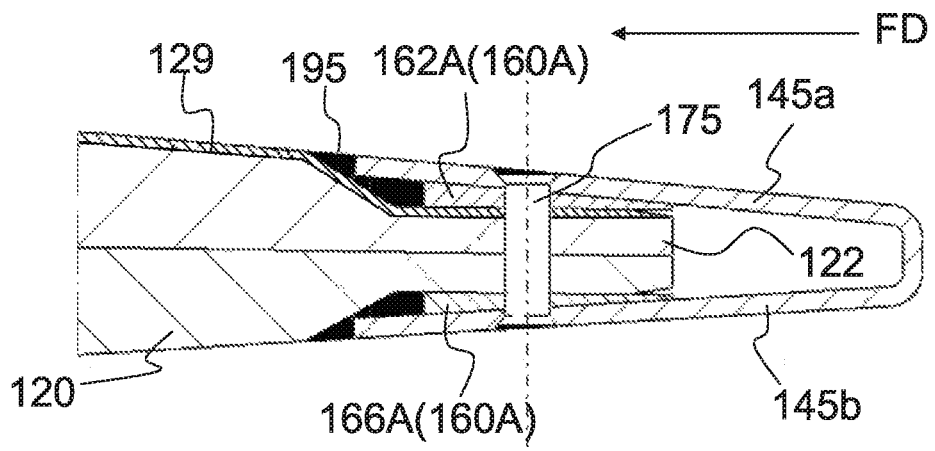
FIGS. 4A to 4C are respectively cross-sectional views of the structural component according to the first embodiment of the present disclosure taken at different positions.
Figure 4B:
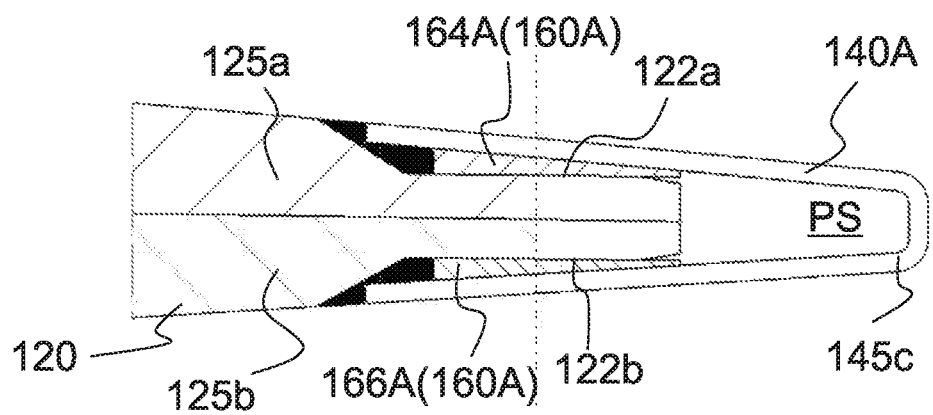
Figure 4C:
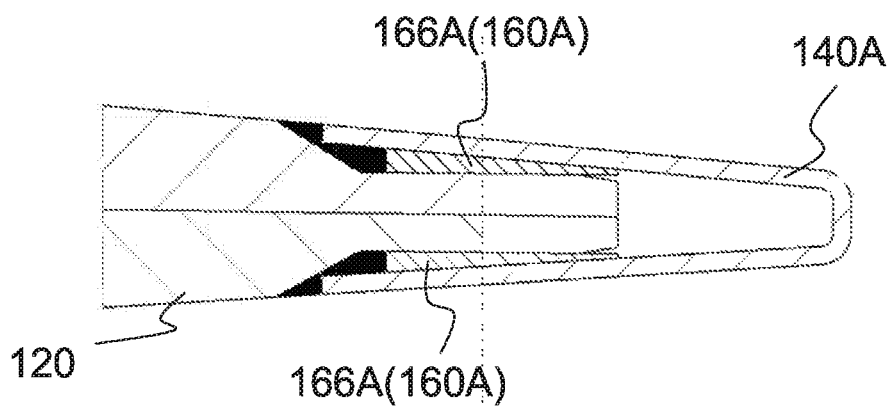

Firstly, a structural component 100 according to a first embodiment of the present disclosure is described with reference to FIG. 2, FIG. 3 and FIGS. 4A to 4C. FIG. 2 is a schematic view illustrating a structural component according to the present disclosure; FIG. 3 is a schematic view illustrating a part of a structural component according to a first embodiment of the present disclosure; and FIGS. 4A to 4C are respectively cross-sectional views of the structural component according to the first embodiment of the present disclosure taken at different positions.

Figure 9:
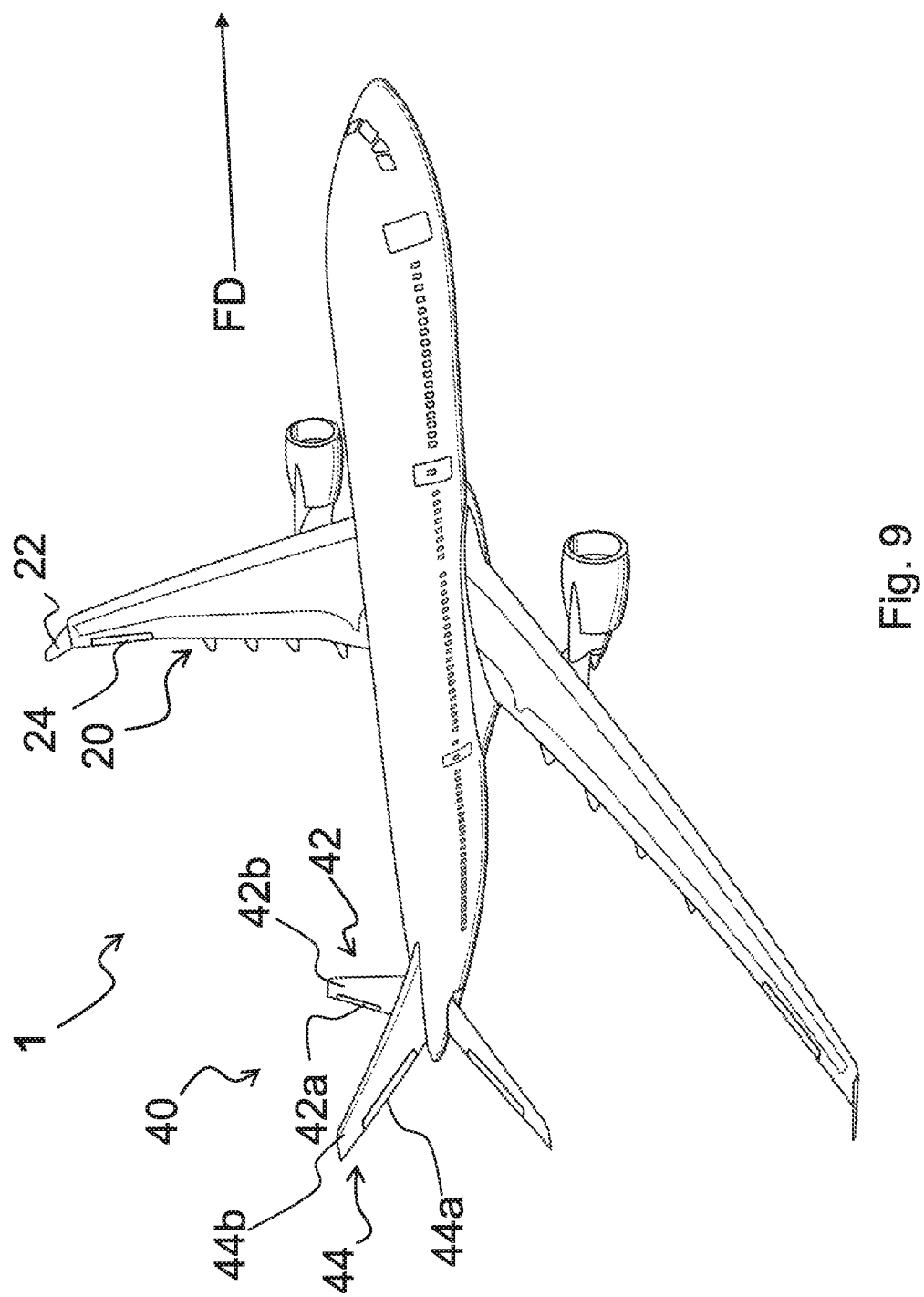
FIG. 9 is a perspective view illustrating an aircraft employing the structural component according to the present disclosure.

In the example illustrated, the structural component 100 according to the first embodiment of the present disclosure is exemplified as an elevator 42a of a horizontal empennage 42 of an empennage 40 (with reference to FIG. 9 which is a perspective view illustrating an aircraft employing the structural component according to the present disclosure). However, it is to be understood that, the structural component 100 according to the present disclosure may also be any other structural components which need to be provided with a profile (for example, a conductive profile), for example: a horizontal fin plane 42b of the horizontal empennage 42 of the empennage 40, a rudder 44a of a vertical empennage 44 of the empennage 40, a vertical fin plane 44b of the vertical empennage 44 of the empennage 40, a winglet 22 of a wing 20 and an aileron 24 of the wing 20.

The structural component 100 may include a body part 120 and a profile 140A. The body part 120 has an outer profile conforming to aerodynamics. The profile 140A may be attached to an edge portion 122 of the body part 120, and has an outer profile adapted, or conforming, to the outer profile of the body part 120 and conforming to aerodynamics. Therefore, the structural component 100 as a whole exhibits an outer profile conforming to aerodynamics (namely, has an aerodynamic outer profile) directly after the profile 140A is attached to the body part 120. In other words, after the profile 140A is attached to the body part 120, the outer profile of the profile 140A can be smoothly (in a streamline manner) joined with the outer profile of the body part 120, such that the outer profile of the structural component 100 does not have an noticeable stepped portion and thus there is no need to perform treatments such as applying aerodynamic fillers to the outside of the structural component 100.

In a preferred example, the profile 140A is a substantially U-shaped profile having a first branch portion 145a and a second branch portion 145b. Therefore, the profile 140A may be attached to the edge portion 122 such that the edge portion 122 is disposed between the first branch portion 145a and the second branch portion 145b. In addition, preferably, the profile 140A is a U-shaped profile whose inner surface and outer surface extending continuously and smoothly without any recesses formed on the inner surface and the outer surface, thereby the profile is easy to be manufactured.

In the example illustrated, the edge portion 122 is a trailing edge with reference to a flight direction FD of the aircraft. However, it is to be understood that, the profile 140A may also be attached to edge portions, at other orientations, of the body part 120.

In some examples, the edge portion 122 may be formed by rear end portions of a first skin 125a and a second skin 125b of the body part 120 superposed together. The skin of the body part 120 may be made of a composite material (for example, a carbon fiber composite material) so as to obtain adequate strength and rigidity with the weight being reduced. Furthermore, the edge portion 122 may include a first side surface 122a facing towards the first branch portion 145a and a second side surface 122b facing towards the second branch portion 145b. In addition, in some examples, the skin of the body part 120 may be made of a sandwich type composite material. For example, the sandwich type composite material is manufactured by attaching two thin but stiff outer skins (such as carbon fiber reinforced plastic) to a thick but lightweight core (such as foam) so as to sandwich the core. Generally, the end of the skin made of the sandwich type composite material has a large change in gradient.

The body part 120 may be provided with a body-part-conductive-region 129 extending to the edge portion 122. The body-part-conductive-region 129 is configured to be electrically connected with the profile 140A made of a conductive material or provided with a conductive region, thus forming a conductive path, for example, leading from the outside of the aircraft to the inside of the aircraft, to achieve static discharging and/or electric signal transmission. In some examples, the body-part-conductive-region 129 may be formed on an outer surface of the skin of the body part 120. In such case, the body-part-conductive-region 129 may be in direct contact with a corresponding conductive portion of the profile 140A or of an intermediate member. In other examples, the body-part-conductive-region 129 may be embedded into the skin of the body part 120. In such case, the body-part-conductive-region 129 may be electrically connected with a corresponding conductive portion of the profile 140A or of the intermediate member via a conductive element (for example, a conductive fastener).

As illustrated in FIG. 4A, in the example illustrated, the body-part-conductive-region 129 is provided at the first side surface 122a. Furthermore, preferably, the body-part-conductive-region 129 is provided at an outboard end (an end away from a fuselage), apt to be accumulated with electrostatic charges, of the structural component 100.

The elevator 42a as an example of the structural component 100 may be a so-called long range (LR) elevator. Therefore, the profile 140A may include multiple sections which are spliced to each other and arranged along a longitudinal direction LD of the profile 140A, thus facilitating manufacture and transportation. In some examples, the profile 140A may include four sections. Each of the multiple sections may be made of the same or different materials, so as to be adapted flexibly to specific application requirements related to, for example, weight, strength and electrical conductivity.

In the first embodiment, an intermediate member 160A may be provided between the profile 140A and the edge portion 122. The intermediate member 160A may include: a first intermediate member (made of steel for example) 162A (referring to FIG. 4A) in contact with the body-part-conductive-region 129; a conductive second intermediate member (made of aluminium alloy or aluminium for example) 164A (as illustrated in FIGS. 3 and 4B) lapping two adjacent sections of the multiple sections on an inner side; and a third intermediate member (made of glass fiber reinforced plastic for example) 166A (as illustrated in FIG. 4C) provided in at least a part of the remaining space between the profile 140A and the edge portion 122. Here, particularly, since the second intermediate member 164A made of aluminium alloy is arranged on an inner side, the continuity of electrical conductivity of the entire profile may be maintained while damage to the aerodynamic outer profile of the profile due to outward protrusion of the second intermediate member can be avoided.

In some examples, the desired shape (for example, a shape adapted to a space where the third intermediate member is located) of the third intermediate member 166A can be obtained by laying a glass fiber reinforced plastic material on the trailing edge 122 and then performing a cutting process to the glass fiber reinforced plastic material and so on. It is also possible to first process the glass fiber reinforced plastic material into the desired shape and then to arrange it on the trailing edge.

The body-part-conductive-region 129 may be formed of a copper mesh having a superior electrical conductivity, and the profile 140A (particularly, each section of the profile 140A) may be made of aluminum alloy having a light weight and a good electrical conductivity. In some examples, a wall thickness of the U-shaped profile 140A made of aluminum alloy may be approximately 1.4 mm. In addition, it should be noted that the wall thickness of the U-shaped profile 140A is selected depending on the specification of the used countersunk rivet (especially the length of the head of the countersunk rivet).

The first intermediate member 162A may be made of steel having an inferior electrical conductivity and a slightly heavier weight, so as to avoid accelerated corrosion (that is, the so-called galvanic corrosion) of for example the aluminum alloy caused by direct contact of the aluminum alloy with the copper mesh. In addition, although the steel having an inferior electrical conductivity and a slightly heavier weight is used, since the first intermediate member 162A is only used in a small area in contact with the body-part-conductive-region 129, that is, the first intermediate member 162A may be small, it will not lead to inappropriate weight increase and inappropriate deterioration of electrical conductivity.

In particular, the first intermediate member 162A, the second intermediate member 164A and the third intermediate member 166A are provided in a space between the first branch portion 145a and the first side surface 122a. For example, in the case that two sections are provided, the first intermediate member 162A, the third intermediate member 166A, the second intermediate member 164A located at a spliced part of the two sections and the third intermediate member 166A (these members may be butt-joined and may also be spaced by some space) are sequentially provided from an outboard end to an inboard end (an end near the fuselage). Only the third intermediate member is provided in a space between the second branch portion 145b and the second side surface, thereby due to the single member provided the space at the lower side may be easily filled and the weight can be reduced. In this manner, since the first intermediate member 162A made of steel is only provided in the small area in contact with the body-part-conductive-region 129, and the second intermediate member 164A made of aluminum alloy is only provided at the spliced part of the two sections and the remaining region is filled with lightweight glass fiber reinforced plastic (FRP or GFRP), the continuity of electrical conductivity of the structural component can be maintained while weight increase of the structural component is controlled.

In addition, in a preferred example, as illustrated in FIG. 4B, a vertex space PS defined by a vertex section 145c of the profile 140A is vacant without any members being disposed therein. Since no any members including the intermediate member and the skin of the body part are disposed in the vertex space PS, inappropriate weight increase of the structural component can be avoided while the front-to-rear width of the profile is allowed to be large enough to ensure sufficient electrical conductivity of the profile.

In addition, a fastener 175 which is preferably a countersunk rivet (double countersunk rivet) is provided, to fasten the profile 140A to the body part 120, more particularly, to fasten all components including the profile and each of the intermediate members together. Further, other possible voids, e.g., recesses located at and around the head of the fastener 175, and possible gaps (small gapping) between the profile 140A and the body part 120 located at the outer surface of the structural component 100, may be filled with a sealant 195.

According to the first embodiment, since the profile is modified to have an outer profile adapted to an outer profile of the body part and conforming to aerodynamics, the treatment, such as applying aerodynamic fillers, performed externally on the structural member after the profile is attached to the body part can be avoided. Thus, the manufacturing process is simplified, the accuracy of forming the aerodynamic outer profile is improved, and the case can be avoided that the aerodynamic filler falls to pieces and is disengaged after long time exposure to the air and thereby the outer profile can be maintained to conform to aerodynamic properties. Further, since the profile is constituted by multiple spliced sections, and different intermediate members are used depending on specific conditions such as requirements of electrical conductivity, space and weight, it is possible to maintain continuity of electrical conductivity and avoid metal contact corrosion and so on while maintaining the weight of the structural component to be substantially constant. Further, as compared to the solution where the U-shaped profile is formed at the free ends thereof with a recess, the profile is easy to be manufactured and the strength thereof can be maintained since the profile has an inner surface and an outer surface extending continuously and smoothly. Further, as compared to the solution where a lightweight part is provided which is formed integrally and has a plurality of holes, the intermediate members are easy to be manufactured and arranged and the adaptability of the structural component is improved since a plurality of separate intermediate members are used. Also, according to the first embodiment, the structural component which has the outer profile conforming to aerodynamics can be obtained efficiently without changing the skins and the front-to-rear width and the rear end thickness of the profile.

Figure 1A:
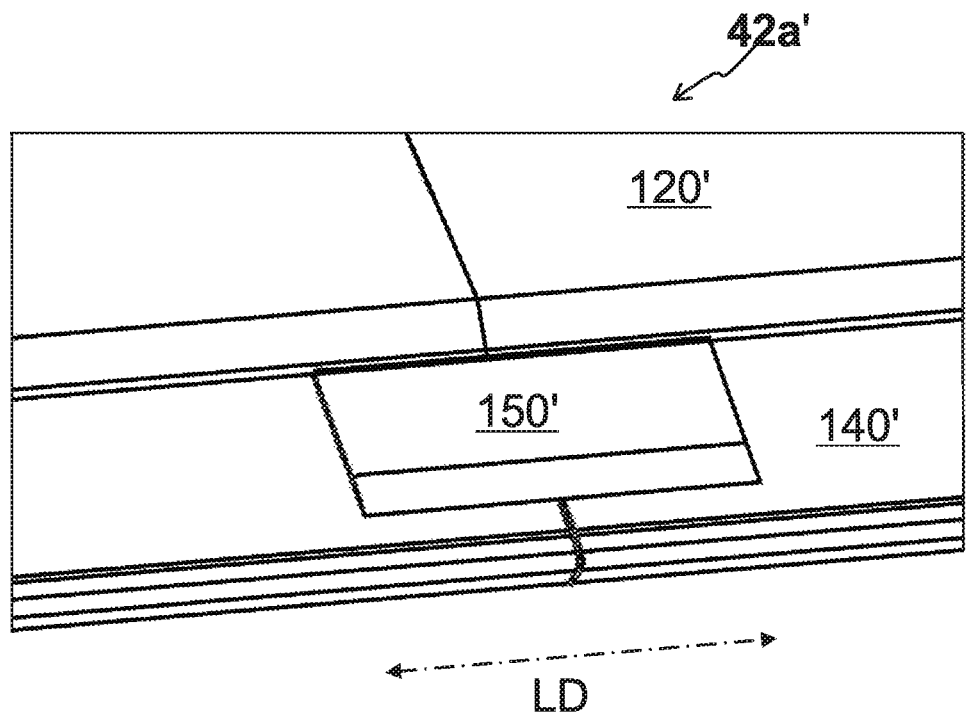
FIGS. 1A and 1B are respectively schematic views illustrating the structure of an elevator according to related art.
Figure 1B:
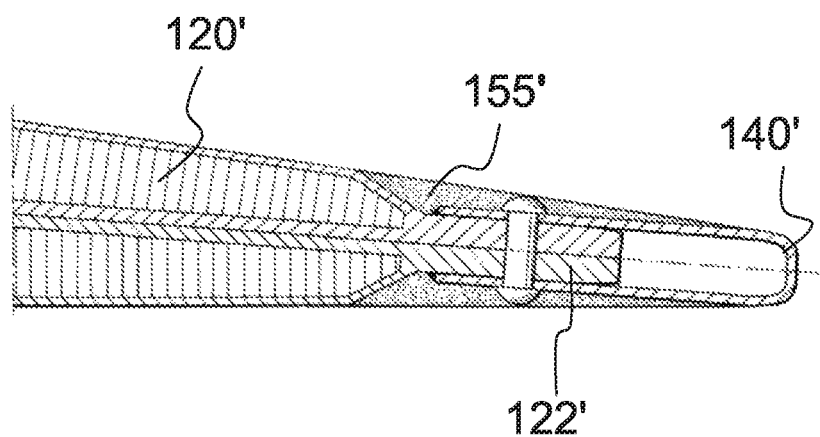

According to an experiment performed on an elevator of a certain model, the structural component 100 according to the first embodiment is increased in weight by only about 1.328 kg (meeting the requirement that the weight is increased by no more than 0.5 kg) as compared to the structural component according to the related art illustrated in FIGS. 1A and 1B. After the profile is attached to the body part, however, the structural component as a whole is just enabled to have an outer profile conforming to aerodynamics and the continuity of electrical conductivity can be maintained.

Figure 5:
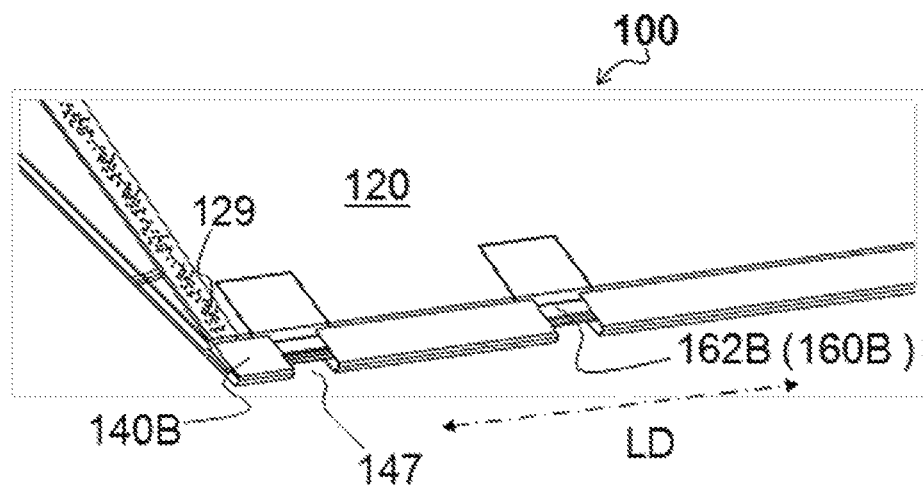
FIG. 5 is a schematic view illustrating a part of a structural component according to a second embodiment of the present disclosure.
Figure 6A:
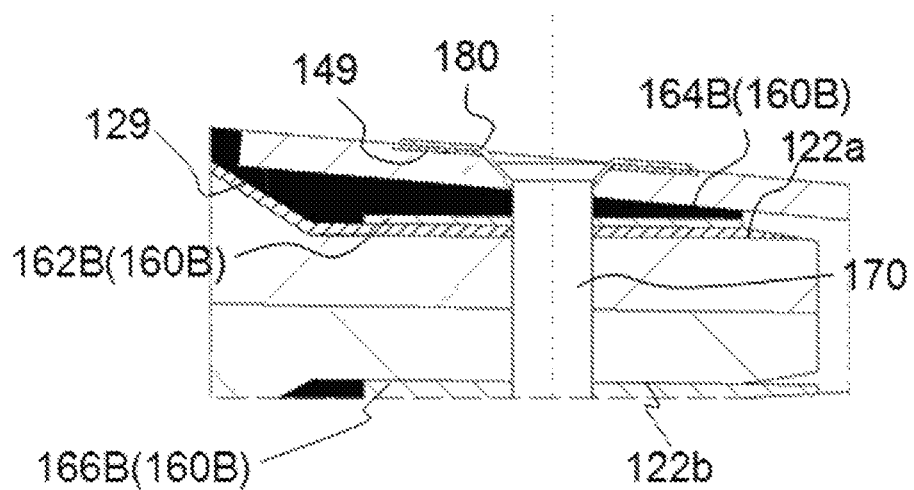
FIGS. 6A and 6B are respectively cross-sectional views of the structural component according to the second embodiment of the present disclosure taken at different positions.
Figure 6B:
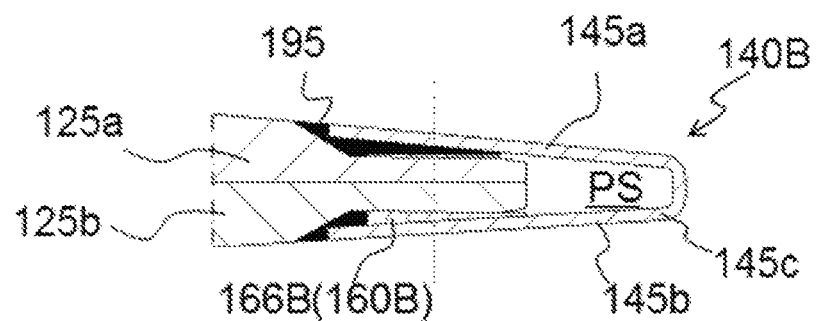

A structural component 100 according to a second embodiment of the present disclosure is described hereinafter with reference to FIGS. 5, 6A and 6B. FIG. 5 is a schematic view illustrating a part of a structural component according to a second embodiment of the present disclosure, and FIGS. 6A and 6B are respectively cross-sectional views of the structural component according to the second embodiment of the present disclosure taken at different positions. For brevity, only aspects in the structural component 100 according to the second embodiment of the present disclosure different from the structural component 100 according to the first embodiment of the present disclosure will be described hereinafter.

In the second embodiment, similarly, an intermediate member 160B may be provided between the profile 140B and the edge portion 122. However, the profile 140B is made of a composite material (such as a carbon fiber composite material) and is provided with a profile-conductive-region 149 (see FIG. 6A) to ensure electrical conductivity of the profile 140B. A wall thickness of the U-shaped profile 140B made of a composite material may also be approximately 1.4 mm. In some examples, the profile-conductive-region 149 may be made of a copper mesh similarly to the body-part-conductive-region 129, and preferably, the profile-conductive-region 149 may be provided on an outer surface of the profile 140B to thereby ensure release of static electricity to the atmosphere.

The intermediate member 160B may include a conductive fourth intermediate member 162B (referring to FIG. 6A) which is in contact with the body-part-conductive-region 129 and is electrically connected with the profile-conductive-region 149. In a preferred example, the fourth intermediate member 162B is made of a copper plate (pure copper or copper alloy plate). In the case that the body-part-conductive-region 129 is provided on the first side surface 122a, the fourth intermediate member 162B may be provided to be in direct contact with the first side surface 122a, and preferably, the profile-conductive-region 149 is provided on an outer surface of the first branch portion 145a of the profile 140B. Further, a fifth intermediate member 164B (see FIG. 6A) may be provided in a space between the fourth intermediate member 162B and the first branch portion 145a, and the fifth intermediate member 164B may be made of a sealant. A sixth intermediate member 166B (see FIG. 6A) may be provided in a space between the second side surface 122b and the second branch portion 145b, and the sixth intermediate member 166B may be made of glass fiber reinforced plastic.

In some examples, in the case that the profile-conductive-region 149 is provided on an outer surface of the profile 140B, the profile-conductive-region 149 may be electrically connected with the fourth intermediate member 162B via a dimpled washer 180 in contact with the profile-conductive-region 149 and a conductive fastener 170 in contact with the dimpled washer 180.

The fourth intermediate member 162B may extend over the entire region of the profile in a longitudinal direction LD thereof. Also, the profile-conductive-region 149 may accordingly be extended over the entire region of the profile in the longitudinal direction LD thereof. Also, the conductive fastener 170, with which the fourth intermediate member 162B is electrically connected with the profile-conductive-region 149, may accordingly be provided in plural in the longitudinal direction LD of the profile. Hereby, the electrical conductivity between the fourth intermediate member 162B and the profile-conductive-region 149 is improved, and consequently the continuity of electrical conductivity of the structural component is improved.

In a preferred example, the profile 140B is provided with one or more cutout portions 147 allowing a portion of the fourth intermediate member 162B to be exposed, so as to allow for example an aircraft static discharger to be mounted to the exposed portion of the fourth intermediate member 162B, thus improving the capability of discharging static electricity to the atmosphere.

Substantially the same technical effects as those obtained by the structural component according to the first embodiment may be obtained by the structural component according to the second embodiment. Also, in the second embodiment, since the profile is made of a composite material provided with the conductive region, it is known through experiments that the structural component 100 according to the second embodiment is reduced in weight by 0.54 kg in comparison with the structural component according to the related art as illustrated in FIGS. 1A and 1B.

Figure 7:
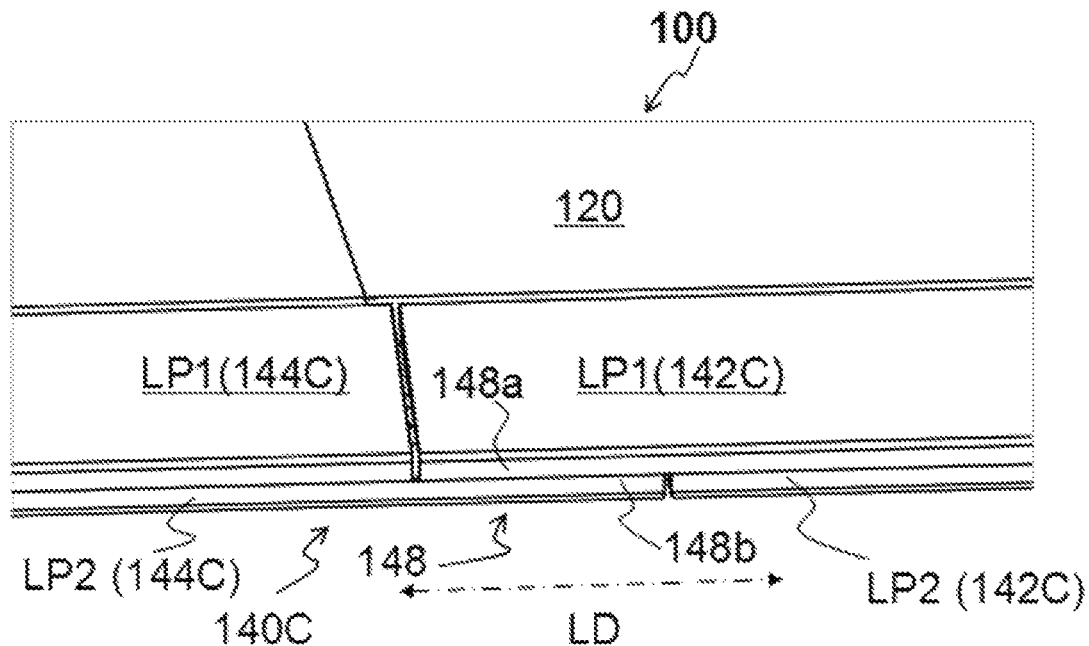
FIG. 7 is a schematic view illustrating a part of a structural component according to a third embodiment of the present disclosure.
Figure 8:
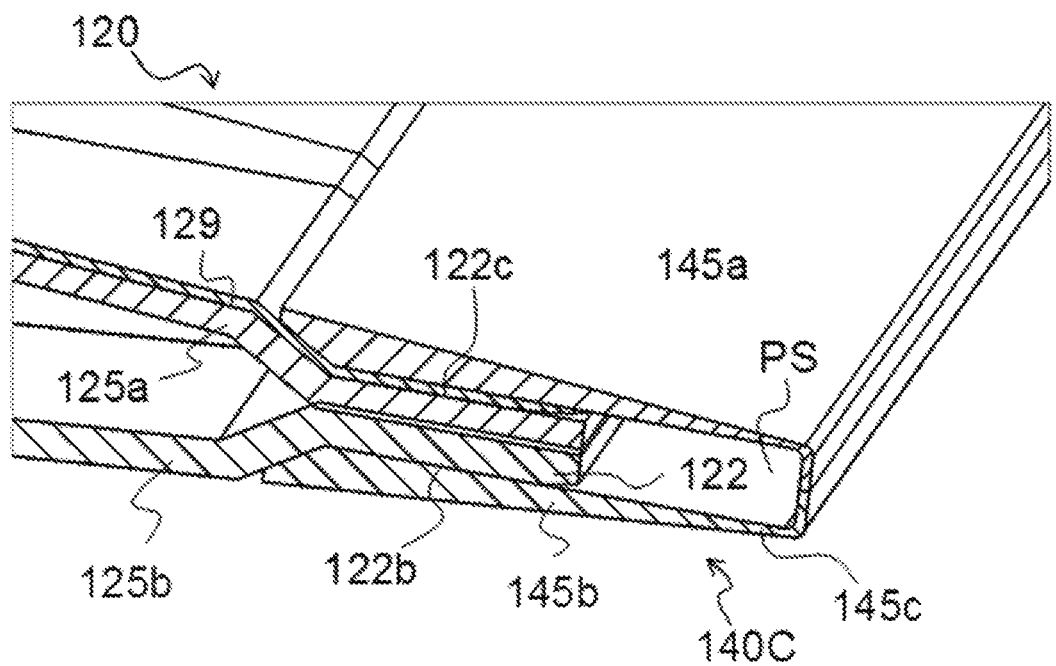
FIG. 8 is a cross-sectional view illustrating the structural component according to the third embodiment of the present disclosure.

A structural component 100 according to a third embodiment of the present disclosure is described hereinafter with reference to FIGS. 7 and 8. FIG. 7 is a schematic view illustrating a part of a structural component according to a third embodiment of the present disclosure and FIG. 8 is a cross-sectional view illustrating the structural component according to the third embodiment of the present disclosure. For brevity, only aspects in the structural component 100 according to the third embodiment of the present disclosure different from the structural components 100 according to the first embodiment and the second embodiment of the present disclosure will be described hereinafter.

In the third embodiment, the profile 140C is in contact with the edge portion 122 and includes multiple sections (for example, four sections) arranged in the longitudinal direction of the profile 140C. A first section 142C and a second section 144C of the multiple sections are illustrated in FIG. 7. The second section 144C is in contact with the body-part-conductive-region 129 (for example, made of a copper mesh) provided at the first side surface 122a.

Each section of the multiple sections 142C, 144C includes a first side portion LP1 and a second side portion LP2 which are connected (for example, welded) together. In the second section 144C (which is a left section in FIG. 7 and is located at an outboard end of the structural component, for example, an elevator) in contact with the body-part-conductive-region 129, it is the first side portion (an upper side portion) LP1 that is in contact with the body-part-conductive-region 129. As such, the first side LP1 is made of steel, and the second side LP2 and the side portions of other sections are all made of aluminium alloy or aluminium. In this way, since only the first side portion LP1 in contact with the body-part-conductive-region 129 is made of steel, inappropriate deterioration of electrical conductivity and inappropriate weight increase can be avoided while inducing accelerated corrosion can be avoided.

In the third embodiment, a lapping portion 148, which is located at a vertex of the U-shape of the profile 140C and is overlapped in a lateral direction perpendicular to the longitudinal direction LD of the profile, is formed (provided) between two adjacent sections of the multiple sections 142C, 144C. For example, the first section 142C has an overlapping portion 148a, and the second section 144C has an overlapping portion 148b matching with the overlapping portion 148a. Hereby, the lapping 148 is formed by the overlapping portion 148a and the overlapping portion 148b when the first section 142C and the second section 144C are assembled together. In this way, electrical conductivity between the sections is facilitated and the installation of the sections is also facilitated. For installation, for example, firstly the first side portion and second side portion of each section are welded together, and then the welded sections are attached to the edge portions 122, and then two adjacent sections are fixed together at the lapping portion 148 by using a fastener such as a rivet. The rivet is preferably a double countersunk rivet. Further, the double countersunk rivet may also be employed in other areas than the lapping portion as mentioned above.

Substantially the same technical effects as those obtained by the structural components according to the first embodiment and the second embodiment may be obtained by the structural component according to the third embodiment. In the third embodiment, although there is an increase in weight by about 2.761 kg which is known through experiments in comparison with the structural component according to the related art as illustrated in FIGS. 1A and 1B, the requirement that the weight is increased by no more than 5 kg is still met. Also, superior continuity of electrical conductivity and structural strength are achieved in the third embodiment.

Further, referring to FIG. 9, an aircraft 1 including the structural component as described above is also provided according to the present disclosure.

The structural component according to the present disclosure may allow for various variations. For example, the materials described above as examples may be replaced by similar materials. Particularly, the glass fiber reinforced plastic may be replaced by a carbon fiber composite material.

In the specification, use of the orientation terms "upper" and "lower" and so on is merely for description purpose, and should not be considered as a limitation.

In the present Specification, when referring to "exemplary embodiment", "some examples", "other examples", "preferred example", "example illustrated" and so on, it means that detailed features, structures or characteristics described in relation to the embodiment/example are included in at least one of the embodiments/examples of the present disclosure, and the appearance of these words in the present disclosure does not necessarily denote the same embodiment/example. In addition, when detailed features, structures or characteristics are described in relation to any of the embodiments/examples, it should be considered that these features, structures or characteristics can also be achieved by the skilled in the art in other embodiments/examples of all of the embodiments/examples.

While the present disclosure has been described with reference to the exemplary embodiments, it should be understood that the present disclosure is not limited to the specific embodiments/examples described and illustrated in detail herein, and those skilled in the art can also make various modifications to the exemplary embodiments without departing from the protection scope defined by the claims.

The invention claimed is:

1. A structural component for an aircraft wing body, comprising:
   a body part having an outer profile;
   a profile member having an outer profile;
   wherein the body part comprises an edge portion formed by end portions of a first skin and a second skin of the body part superposed together, the profile member being attached to the edge portion;

wherein the outer profile of the profile member conforms to the outer profile of the body part such that the structural component, as a whole, exhibits an aerodynamic outer profile after the profile member is attached to the edge portion;

wherein the profile member is attached to the edge portion via a plurality of separate intermediate members, or wherein the profile member is attached to the edge portion by contacting the edge portion;

wherein the profile member is a substantially U-shaped profile having a first branch portion and a second branch portion, and the profile member is attached to the edge portion in such a manner that the edge portion is disposed between the first branch portion and the second branch portion;

the profile member is made of a composite material and is provided with a profile-conductive-region on the outer profile;

a sealant disposed between a portion of the first branch portion and the first skin, the at least one of the plurality of separate intermediate members comprises a conductive fourth intermediate member which is in contact with a body-part-conductive-region and is electrically connected with the profile-conductive-region, the edge portion comprises a first side surface facing the first branch portion and a second side surface facing the second branch portion, and only the first side surface is provided with the body-part-conductive-region, the fourth intermediate member contacts the first side surface, and a fifth intermediate member is provided in a first space between the fourth intermediate member and the first branch portion, and a sixth intermediate member is provided in a second space between the second side surface and the second branch portion.

2. The structural component according to claim 1, wherein the body-part-conductive-region extends to the edge portion.

3. The structural component according to claim 1, wherein the body-part-conductive-region comprises a copper mesh, the profile-conductive-region comprises a copper mesh, the fourth intermediate member is made of a copper plate, the fifth intermediate member is a sealant, and the sixth intermediate member is made of glass fiber reinforced plastic.

4. The structural component according to claim 1, wherein:
   the profile-conductive-region is provided on an outer surface of the profile member, and
   the profile-conductive-region is electrically connected with the fourth intermediate member via a washer in contact with the profile-conductive-region and a conductive fastener in contact with the washer.

5. The structural component according to claim 1, wherein the profile member is provided with at least one cutout portion allowing a portion of the fourth intermediate member to be exposed.

6. The structural component according to claim 1, wherein a vertex space defined by a vertex section of the profile member is vacant without any members being disposed therein.

7. The structural component according to claim 1, wherein a countersunk fastener adapted to fasten the profile member to the body part is provided.

8. The structural component according to claim 1, wherein the aircraft wing body comprises an empennage and a wing, and the structural component is an elevator of a horizontal empennage of the empennage, a horizontal fin plane of the horizontal empennage of the empennage, a rudder of a vertical empennage of the empennage, a vertical fin plane of the vertical empennage of the empennage, a winglet of the wing and/or an aileron of the wing.

9. An aircraft comprising the structural component according to claim 1.

* * * * *